May 14, 1935.    R. THOMSON    2,001,290
MEANS FOR FORMING A FLUID TIGHT JOINT
Filed June 17, 1933
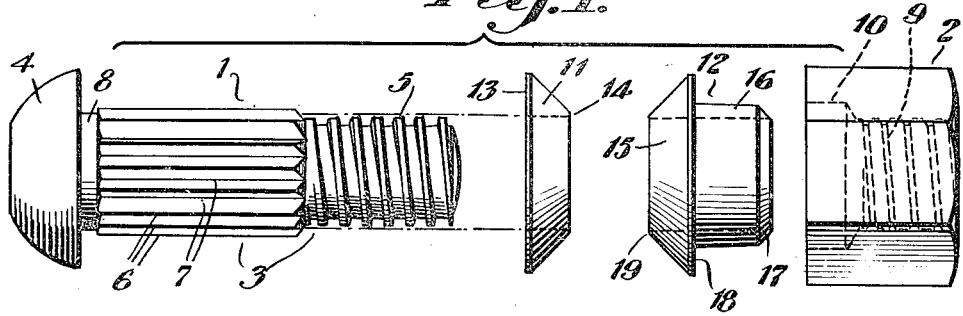
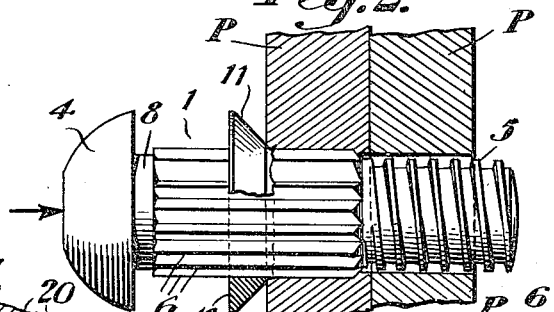
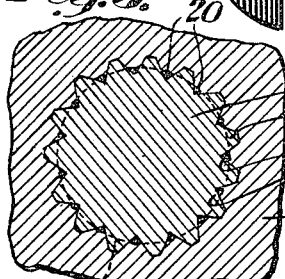
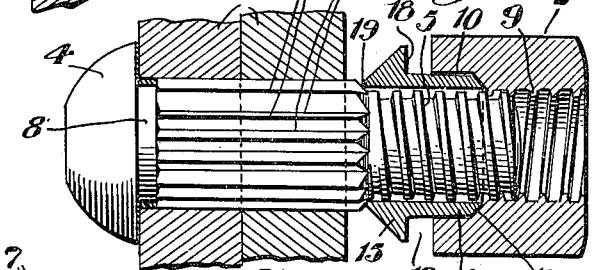
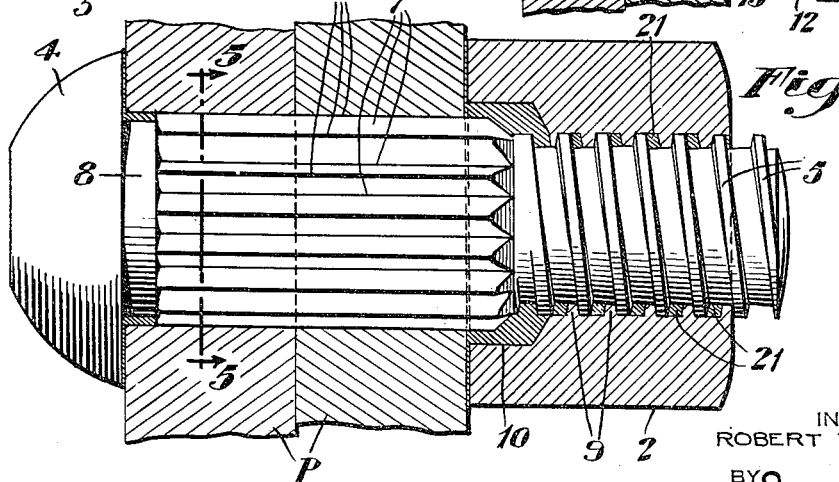
INVENTOR
ROBERT THOMSON
BY
ATTORNEYS Patented May 14, 1935

2,001,290

UNITED STATES PATENT OFFICE 2,001,290

MEANS FOR FORMING A FLUID-TIGHT JOINT

Robert Thomson, Arlington, N. J., assignor to Dardelet Threadlock Corporation, New York, N. Y., a corporation of Delaware Application June 17, 1933, Serial No. 676,262

6 Claims. (Cl. 85—1)

This invention relates more particularly to improvements in a joint of the type disclosed in a co-pending U. S. patent application, Serial No. 589,387, filed January 28, 1932. In said joint a fastening device having the desirable characteristics of both a bolt and a rivet is employed for joining metal plates, structural steel parts, and the like.

An important object of the present invention is to render such a joint fluid-tight.

Other objects of the invention will appear hereinafter.

In the drawing, Fig. 1 is a group view showing in side elevation the fastening elements and the sealing elements employed in forming the fluid-tight joint;

Fig. 2 a sectional side view showing the bolt element of the fastening means being driven through registering bolt holes and through one of the sealing elements;

Fig. 3 a sectional side view showing the bolt element fully driven into place and sealed at the head by the metal of said sealing element, and showing also the other sealing element and the nut loosely applied to the bolt;

Fig. 4 a sectional side view of the finished sealed joint; and

Fig. 5 a cross section on the line 5—5 of Fig. 4.

The fastening means includes a bolt 1 and a nut 2. The bolt comprises a shank 3 having a rounded head 4 with a flat abutment face, and an opposite end portion of reduced diameter and having a screw thread 5. Between the head and the thread the shank is corrugated or serrated to form longitudinal ribs or splines 6 and intervening grooves 7. Said ribs and grooves are approximately V-shaped in cross section and they preferably extend from a point spaced slightly from the abutment face of the head to a point at or closely adjacent the inner end of the thread. At the latter point they taper sharply inward. The serrations may be formed by a cold rolling process upon a blank bolt shank having a larger cylindrical portion for the serrations and a reduced cylindrical end portion for the thread. The rolling process, in forming the grooves 7, transversely extrudes the metal of the blank to form the crests of the splines 6. Said extruded crests protrude radially beyond the original radius of the blank. The short portion of the blank between the head and the adjacent end of the splines forms a neck 8 whose diameter is that of the blank portion from which the splines are formed. Preferably the groove bottoms are depressed radially nearer the shank axis than the crest of the thread 5.

The thread 5 of the bolt and the thread 9 of the nut are complementary threads of equal and constant pitch and are of the well-known Dardelet type of screw thread disclosed in U. S. Patent No. 1,657,244. The crest of the nut thread and the root of the bolt thread slope inward and make an angle of preferably six degrees with the thread axis, this being within the angle of repose of the metal or metals of the threads. The ribs of the threads are much narrower than the grooves to permit relative crosswise displacement of the threads in an axial direction for self-locking mutual engagement of said sloping crest and root locking surfaces. The threads also have opposed, coacting abutment faces disposed at an abrupt angle to the thread axis to positively limit said crosswise displacement.

At its abutment face the nut has a recess in the form of a counterbore 10 having a diameter exceeding the maximum diameter of the threads and also slightly exceeding the maximum diameter of the serrated portion of the bolt. The depth of the counterbore exceeds, preferably by about one-eighth of an inch, the axial distance between the adjacent end of the serrated portion of the bolt and the point where the bolt thread begins to run out and become imperfect. The counterbore permits the nut to be screwed fully against an abutment without obstruction by the splines and the imperfect inner end of the thread, and said excess depth of the counterbore allows for variation in thickness of the parts P.

For joining steel parts the bolt and nut are preferably made of an alloy steel having great tensile strength. A commercial steel containing manganese has been found to be well suited for the purpose. Such a steel is well adapted for cold rolling.

For effectually sealing a joint employing the fastening device just described two deformable sealing washers 11 and 12 are provided. These washers are especially designed to cooperate with said bolt and nut to obtain maximum sealing effect. They are made of a metal much softer than the bolt and nut. Preferably they are made of lead formed to shape. They may be made of any other suitable material however, such as annealed copper, for example.

The washer 11 is of substantially frusto-conical form. Its radial cross section is substantially triangular or wedge-like. This provides the washer with an abutment end or face 13 affording a broad, flat abutment area and a reduced end affording a greatly reduced annular abutment area 14 immediately surrounding the aperture of the washer. The aperture is cylindrical and its diameter is materially less than the maximum diameter of the splined portion of the bolt but is sufficient to permit the washer to be fitted over the reduced, threaded end of the bolt. The maximum diameter of the washer is approximately equal to that of the bolt head.

Washer 12 is formed with a substantially frusto-conical head 15 and a tubular shank 16 of materially reduced diameter. The shank tapers slightly for most of its length and it is of a diameter to fit within the counterbore recess of the nut. At its extremity the shank is tapered sharply as at 17, to fit against the bottom of said recess which is correspondingly tapered. In radial cross section the head of the washer is of outwardly tapering, substantially triangular form to afford a broad flat abutment face 18 and a greatly reduced annular end abutment area 19 immediately surrounding the washer aperture. The aperture is cylindrical and its diameter is materially less than the maximum diameter of the serrated portion of the bolt shank but is sufficient to permit the washer to be fitted over the reduced threaded end of the shank. The length of the washer is less than the length of the threaded portion of the bolt shank.

In applying the fastening means and the sealing means the reduced threaded end of the bolt is inserted through the aperture of washer 11 from the flat side of the washer. Then said end of the bolt is inserted as far as it will freely go through registering bolt holes of slightly greater diameter than said threaded end but of less diameter than the serrated portion of the bolt. Then, by impact or pressure upon the head, the shank is forcibly driven through the bolt holes and through the washer 11. The bolt will be of harder metal than the parts P to be joined so that the metal of the latter will be extruded into the grooves 7 between the splines as shown in Fig. 5, when the bolt is driven through the bolt holes. Thereby the bolt is laterally bound in the bolt holes and also locked against turning. Also, the metal of the washer will be extruded to a certain degree into the grooves.

When the head of the bolt reaches the washer and is driven farther, the broad flat face 13 of the washer will receive the driving thrust and the reduced abutment end 14 of the washer will be subjected to a powerful, concentrated pressure at the adjacent bolt hole. Heat generated in the lead by this concentrated pressure softens the lead to fluid or semi-fluid condition and the lead is flowed and forced by the advance of the bolt into the bolt hole to completely charge the space around the neck 8 and also charge the groove spaces along the bolt shank, as indicated at 20 in Fig. 5. Surplus lead is squeezed out between the bolt head and the opposed face of the adjacent part P and a small film or scale of lead may be left therebetween. Thereby the head and adjacent portion of the shank are completely sealed. The cross sectional form of the washer, with its radial width increasing from the reduced end 14 to the abutment face 13 enables the washer to strongly resist radial expansion under end compression. This assists in forcing a maximum amount of the lead into the bolt hole.

The splines 6 are preferably of such length with relation to the thickness of the parts P that they will extend entirely through the hole in the second part and possibly protrude slightly when the bolt is driven as far as it will go. After the bolt has been fully driven the washer 12 is placed, tapered head first, on the threaded end of the bolt. Next, the nut is screwed on the bolt and the tubular shank of the washer is first nested partly within the base recess of the nut, as shown in Fig. 3. As the nut is screwed farther the washer is placed under endwise compression between the ends of the splines 6 and the bottom of the nut recess. The greatly reduced tapered end of the washer are subjected to a concentrated pressure which generates sufficient heat to render the lead fluid or semi-fluid at the washer ends and start it flowing along the splines and into the adjacent bolt hole and also in the opposite direction along the bolt and nut threads. Heat is also generated by the friction of nut rotation. As the nut advances, buckling and radial expansion of the washer is resisted by the confinement of its tubular shank in the nut recess and also by the radially protruding portion of the head of the washer which forms, in effect, a reinforcing ring. This assists the flowing of a maximum amount of lead endwise into the bolt holes and along the splines and also into the threaded portion of the nut.

When the nut is screwed fully home the washer lead is molded to completely fill the nut recess 10, fill the interstices between the serrated portion of the bolt and the parts P and also fill the crosswise clearance between the bolt and nut threads, as indicated at 21 in Fig. 4. The charging of said thread clearance effectually excludes moisture from the threads, within the nut. As shown in Figs. 4 and 5 the finished joint is completely sealed and fluid-tight. Excess lead of the washer 12 is squeezed out from between the base of the nut and the adjacent part P. A thin film or scale of lead may be left therebetween.

In the finished joint the rib of the nut thread is displaced outward with respect to the bolt thread and the locking surface of said thread is thereby jammed into frictional self-locking engagement with the locking surface at the root of the bolt thread, as shown in Fig. 4. Thereby the bolt, the nut and the parts P are held securely locked together and the seal is kept unbroken. The nut may be unscrewed, however, if it is required to open the joint.

Features of the fastening means shown and described in this application, but not claimed, are claimed in the aforesaid co-pending application, Serial No. 589,387.

What I claim is:

1. Means to form a fluid-tight joint, comprising a bolt and nut of the type wherein the bolt has a head and a reduced screw-threaded end portion at opposite ends of a non-screw-threaded shank portion whose periphery has corrugations therealong and therearound, for the purpose set forth, and the diameter of the corrugated portion exceeds that of the threaded portion, and wherein the bore of the nut is enlarged in the base of the nut to receive one end of the corrugations, and an extrusile sealing washer of softer metal than the bolt and nut and having a head at one end of outwardly tapering wedge-like form in radial cross-section and a tubular shank of reduced external diameter fittable into the enlarged portion of the nut bore and of greater length than the enlarged portion of the bore, the bore of the washer being of sufficient size for fitting of the washer head-first over the threaded end of the bolt but smaller than the corrugated portion of the bolt, to abut the washer against the adjacent ends of the corrugations, and the abutting extremity of the headed end of the washer not exceeding the adjacent end of the corrugated portion of the bolt in external diameter, whereby when the nut is screwed against the washer the metal of the washer will be extruded by consequent heat and pressure into the nut and into the grooves between the bolt corrugations.

2. Means to form a fluid-tight joint with a bolt and nut fastener of the type wherein the bolt has a head and a reduced screw-threaded end portion at opposite ends of a non-screw-threaded shank portion whose periphery has corrugations therealong and therearound, for the purpose set forth, and the diameter of the corrugated portion exceeds that of the threaded portion, and wherein the bore of the nut is enlarged in the base of the nut, comprising an extrusile sealing washer of softer metal than that of the bolt and whose aperture is sufficient for fitting of the washer over the threaded end of the bolt but is smaller than the corrugated portion of the bolt, said washer having a tapering wedge-like form in radial cross-section to enter a bolt hole and provide materially reduced initial annular contact of the washer with the margin of the bolt hole and resist radial expansion under endwise compression, and an extrusile sealing washer of softer metal than the bolt and nut and having a head at one end of outwardly tapering wedge-like form in radial cross section and a tubular shank of reduced external diameter fittable into the enlarged portion of the nut bore, the bore of the washer being of sufficient size for fitting of the washer head-first over the threaded end of the bolt but smaller than the corrugated portion of the bolt, to abut the extremity of the washer head against the adjacent ends of the corrugations, whereby when the nut is screwed against the washer the metal of the washer will be extruded by consequent heat and pressure into the nut and into the grooves between the bolt corrugations.

3. Means to form a fluid-tight joint comprising a bolt and nut fastener of the type wherein the bolt has a head and a reduced screw-threaded end portion at opposite ends of a non-screw-threaded shank portion whose periphery has corrugations therealong and therearound and the diameter of the corrugated portion exceeds that of the threaded portion, for the purpose set forth, and wherein the bore of the nut is enlarged in the base of the nut and the threads of the bolt and nut are of the Dardelet self-locking type with grooves wider than their ribs, and an extrusile sealing washer having an outwardly tapering substantially frusto-conical head at one end and a reduced tubular shank of greater length than the length of said enlarged portion of the nut bore and fittable therein, the bore of the washer being of sufficient size for fitting of the washer head-first over the threaded end of the bolt but smaller than the corrugated portion of the bolt shank, whereby the reduced extremity of the tapered washer-head will abut the adjacent ends of the bolt corrugations and whereby when the nut is screwed against the washer the metal of the washer will be extruded by consequent heat and pressure into the grooves between the bolt corrugations and also into and along the helical space between the bolt and nut thread ribs.

4. Means to form a fluid-tight joint with a bolt and nut fastener of the type wherein the bolt has a head and a reduced screw-threaded end portion at opposite ends of a non-screw-threaded shank portion, and wherein the bore of the nut is enlarged in the base of the nut and the threads of the bolt and nut are of the Dardelet self-locking type with grooves wider than their ribs, comprising a sealing means formed by an extrusile washer having an outwardly tapering, substantially frusto-conical head at one end and a reduced tubular shank of greater length than the length of said enlarged portion of the nut bore and fittable therein, the bore of the washer being of sufficient size for fitting of the washer head-first over the threaded end of the bolt, whereby when the nut is screwed against the washer the metal of the washer will be extruded by consequent heat and pressure into and along the helical space between the bolt and nut thread ribs as the nut is screwed on the bolt.

5. Means to form a fluid-tight joint comprising a bolt and nut fastener of the type wherein the bolt has a head and a reduced screw threaded end portion at opposite ends of a non-screw-threaded shank portion whose periphery has corrugations therealong and therearound for the purpose set forth and the diameter of the corrugated portion exceeds that of the threaded portion and wherein the bore of the nut is enlarged in the base of the nut to receive one end of the corrugations, an extrusile sealing washer of softer metal than the bolt and whose aperture is sufficient for fitting of the washer over the threaded end of the bolt but is smaller than the corrugated portion of the bolt, to necessitate driving of the washer on the bolt over the corrugated portion, and whose external diameter and radial thickness are reduced at one end of the washer to enter a bolt hole and to provide materially reduced initial annular contact of the washer with the margin of the bolt hole and are increased inward of said end to resist radial expansion under endwise compression, and an extrusile sealing washer of softer metal than the bolt and nut and whose aperture is of sufficient size for fitting of the washer over the threaded end of the bolt but is smaller than the corrugated portion of the bolt and whose external diameter and radial thickness are materially reduced at both ends to reduce the end abutment areas closely surrounding the aperture and to permit one end to enter the enlarged portion of the nut bore, the external diameter and radial thickness being materially increased between the ends to resist radial expansion under endwise compression, whereby when the nut is screwed against the washer the latter will be compressed between the nut and the adjacent ends of the corrugations to extrude the metal of the washer into the nut and into the grooves between the corrugations.

6. Means to form a fluid-tight joint with a bolt and nut fastener of the type wherein the bolt has a head and a reduced screw-threaded end portion at opposite ends of a non-screw-threaded shank portion whose periphery has corrugations therealong and therearound for the purpose set forth, and the diameter of the corrugated portion exceeds that of the threaded portion and wherein the bore of the nut is enlarged in the base of the nut to receive one end of the corrugations, comprising an extrusile sealing washer of softer metal than the bolt and nut and whose aperture is of sufficient size for fitting of the washer over the threaded end of the bolt but is smaller than the corrugated portion of the bolt and whose external diameter and radial thickness are materially reduced at both ends to reduce the end abutment areas closely surrounding the aperture and to permit one end to enter the enlarged portion of the nut bore, the external diameter and radial thickness being materially increased between the ends to resist radial expansion under endwise compression, whereby when the nut is screwed against the washer the latter will be compressed between the nut and the adjacent ends of the corrugations to extrude the metal of the washer into the nut and into the grooves between the corrugations.

ROBERT THOMSON.